United States Patent [19]

Richardson

[11] Patent Number: 5,029,992
[45] Date of Patent: Jul. 9, 1991

[54] MOTOR-CONTROLLED LENS SYSTEM
[75] Inventor: John R. Richardson, San Jose, Calif.
[73] Assignee: Morpheus Lights, Inc., San Jose, Calif.
[21] Appl. No.: 224,437
[22] Filed: Jul. 26, 1988
[51] Int. Cl.⁵ .............................................. G02B 15/00
[52] U.S. Cl. ................................... 350/429; 350/255; 353/101; 356/147
[58] Field of Search ................ 350/429, 255; 356/138, 356/147; 353/101; 362/268, 269

[56] References Cited
U.S. PATENT DOCUMENTS

| | | | |
|---|---|---|---|
| 4,161,756 | 7/1979 | Thomas | 350/429 |
| 4,357,107 | 11/1982 | Rösli | 356/138 |
| 4,697,891 | 10/1987 | Kawai | 350/429 |
| 4,752,126 | 6/1988 | Fujii | 356/147 |

Primary Examiner—Bruce Y. Arnold
Assistant Examiner—Loha Ben
Attorney, Agent, or Firm—Skjerven, Morrill, MacPherson, Franklin & Friel

[57] ABSTRACT

A stage light projector including an electronically controlled lens system capable of independently positioning two lenses of a triplet lens system to focus light from different selected back focal plane distances to project images having different selected sizes upon a screen or stage at a selected distance.

12 Claims, 7 Drawing Sheets

MOTOR-CONTROLLED LENS SYSTEM

BACKGROUND OF THE INVENTION

1. Field of the Invention

The present invention relates generally to lighting systems and more particularly to a light projector with improved means for controlling the focus, size and direction of a projected beam of light.

2. Discussion of the Prior Art

Conventional stage lighting systems and spot lights have used triplet lenses to focus and vary or "zoom" the size of a projected beam of light. U.S. Pat. No. 3,128,329 uses a well-known Cooke triplet in combination with a negative doublet fourth lens to magnify and focus a light beam. The triplet lenses are mounted fixedly with respect to each other and movably along the optical axis with respect to the fourth lens to adjust the size of the beam. The triplet and fourth lens are movable together relative to the back-focal object plane of a transparency to be imaged to focus the image at the selected size.

U.S. Pat. No. 3,649,113 discloses a projector in which an objective lens and a unitary zoom lens are manually adjusted along their axis to focus an image at a distance after which the zoom lens position may be adjusted to control the image size.

U.S. Pat. No. 4,063,800 describes a projector zoom lens formed from a triplet or three groups of lenses. The outer two lenses are fixed relative to the back-focal object (plane) while the middle lens is relatively movable to vary the size of the projected image.

U.S. Pat. No. 4,118.108 describes a projector zoom lens formed from a triplet including a relatively movable middle lens to vary the beam size, and a movable front lens to focus the beam.

U.S. Pat. No. 4,462,067 describes a spotlight projector including an axially movable light source and a fixedly mounted, adjustable diameter iris to control the size of a projected beam, an axially movable rear lens to focus the beam, and a semi-permanently mounted front lens. Various axial locations are provided with means for semipermanently mounting different types of front lenses to convert the spotlight to shorter or longer "throw" lengths.

U.S. Pat. No. 4,519,020 discloses a variable magnification stage light including two lenses and a light source which are all manually movable along their optical axis to focus and magnify a beam of light.

U.S. Pat. No. 4,627,720 describes a projection in which a zoom lens is axially movable by a lens drive means to adjust the projected image size. A control means responsive to the magnification adjustment of the zoom lens drive controls the focal length.

Lighting systems which move two lenses relative to each other to focus and magnify a light beam must constrain the back-focal object plane and lenses spacings to certain relationships, depending upon the specific characteristics of each lens. Conventional systems in which multiple lens positions are coordinated by mechanical linkages permit only predetermined spacial relationships which would not enable the lenses to focus from different back focal plane distances. Also, such linkages are typically not dimensioned correctly for different types of lenses requiring different axial relationships to focus at any object and/or image distance.

There remains therefore a need for a light projector which can be adjusted simply to use a general range of lens triplets to focus from various back-focal distances to project images at selected sizes at selected front-focal distances.

SUMMARY OF THE PRESENT INVENTION

It is therefore a primary objective of the present invention to provide a lens system which can be reconfigured simply to use a general range of lens triplets to focus from various back focal plane distances to project images at selected sizes at selected front focal plane distances.

It is another objective of the invention to provide a lens system with electronic controls for focusing and magnifying a beam of light.

It is a further objective of the present invention to provide a lens system of the above type in a light projector with electronically controlled tilt and pan actuator mechanisms to control the direction of a beam projected through the lens system.

Briefly, a preferred embodiment of a lens system according to the present invention includes a triplet lens having a fixed converging rear lens, an axially movable diverging middle lens with an electronically controlled middle lens actuator, and an axially movable converging front lens with an electronically controlled front lens actuator. The front and middle lenses are movable independently in response to respective lens actuator drive signals provided by a position control means in response to beam focus and size parameter inputs.

The invention has the advantage that the lens actuator mechanisms are independently driven in response to lens position control signals derived through a transform circuit which converts input parameters for beam focus and size. The position control circuit can be reconfigured simply by replacing a look-up table in the transform circuit with a different look-up table programmed to convert beam focus and size parameters into lens position control signals appropriate for substitute front and middle lenses of different types. This eliminates the need for the lens system to be provided with different mechanical linkages in order to use different types of movable middle and front lenses.

These and other objects of the present invention will become apparent to those skilled in the art upon reading the following detailed disclosure of the preferred embodiment as shown in the several figures of the drawing.

DETAILED DESCRIPTION OF THE PREFERRED EMBODIMENT

Figure 1:
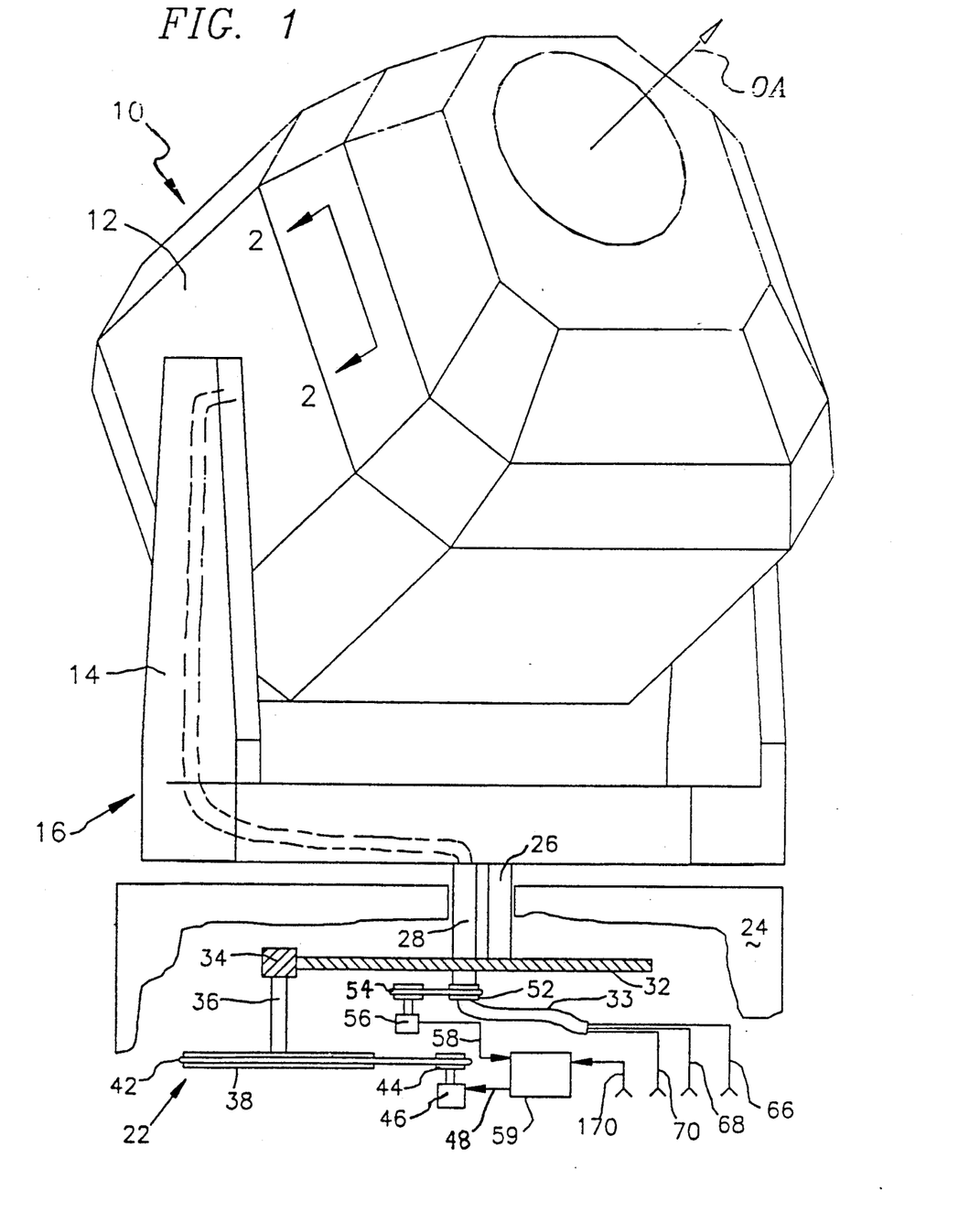
FIG. 1 is a perspective view of a preferred lens system housing which is tiltably mounted between arms of a bracket which is in turn rotatably mounted on a panning mechanism.

The present invention is preferably embodied in a lens system used in a light projector 10 as shown in FIG. 1. The projector projects a light beam along optical axis OA from housing 12. Housing 12 is preferably made of aluminum, and is supported by a pair of tilting mechanisms (not visible in FIG. 1) rotatably connected to opposite arms 14 of U-shaped bracket 16. Bracket arms 14 are joined by a horizontal bar 18 supported by a panning mechanism 22 rotatably mounted on a base 24. Bar 18 is fixedly attached through a stiffener shaft 26 and hollow axel 28 to a large gear 32. Axel 28 surrounds a sleeve 33 containing parameter input lines for actuator controls inside housing 12. Housing 12 (through bracket 16, shafts 26 and 28) and gear 32 may be rotated by a small gear 34 mounted on shaft 36 attached to a pulley 38 turned by belt 42. Belt 42 is turned through pulley 44 by motor 46 driven by actuator drive signals received on line 48 in response to pan control signals representing panning parameters input on line 170 as explained below. Rotations of housing 12, bracket 16, axel 28, and pulley 52 are relayed through belt 54 pan actuator control 172 within which to a stationary potentiometer 56 generates pan position feedback signals output on line 58 to pan comparator 59.

Figure 2:
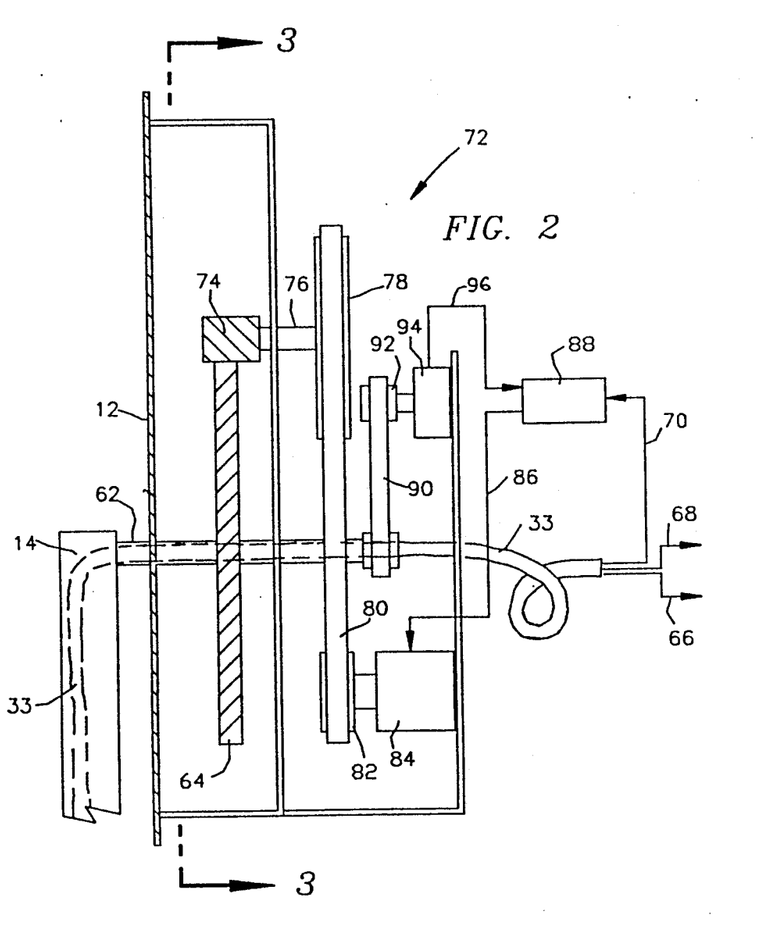
FIG. 2 is a cross section taken along line 2—2 of FIG. 1 through a tilting mechanism connecting one of the bracket arms to the housing.
Figure 3:
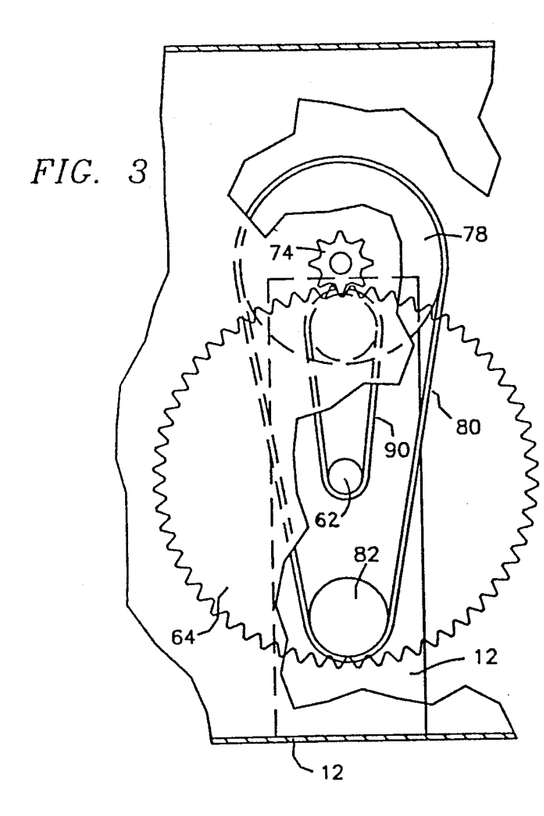
FIG. 3 is a partially broken away view taken along line 3—3 through the tilting mechanism of FIG. 2.

Referring to FIGS. 2 and 3, housing 12 is supported by, and rotatable around, a pair of hollow axels of which only axel 62 is shown rigidly connected to arms 14 of bracket 16. Axel 62 is rigidly connected to a large gear 64 and surrounds a sleeve 33 containing parameter input lines 66, 68, and 70. Housing 12 is controllably turned around large gear 64 by a tilting mechanism 72 through a small gear 74 turned by a shaft 76 attached to a pulley 78, which is turned by a belt 80 looped around a pulley 82. Pulley 82 of motor 84 is driven by actuator drive signals on line 86 from tilt comparator 88 in response to tilt control signals (parameters) input on line 70. Bracket arm 14 and rigidly connected axel pulley 92 rotations relative to housing 12 are relayed through belt 90 to pulley 92 of potentiometer 94 which generates corresponding tilt position feedback signals on line 96 in tilt actuator control 168.

Figure 4:
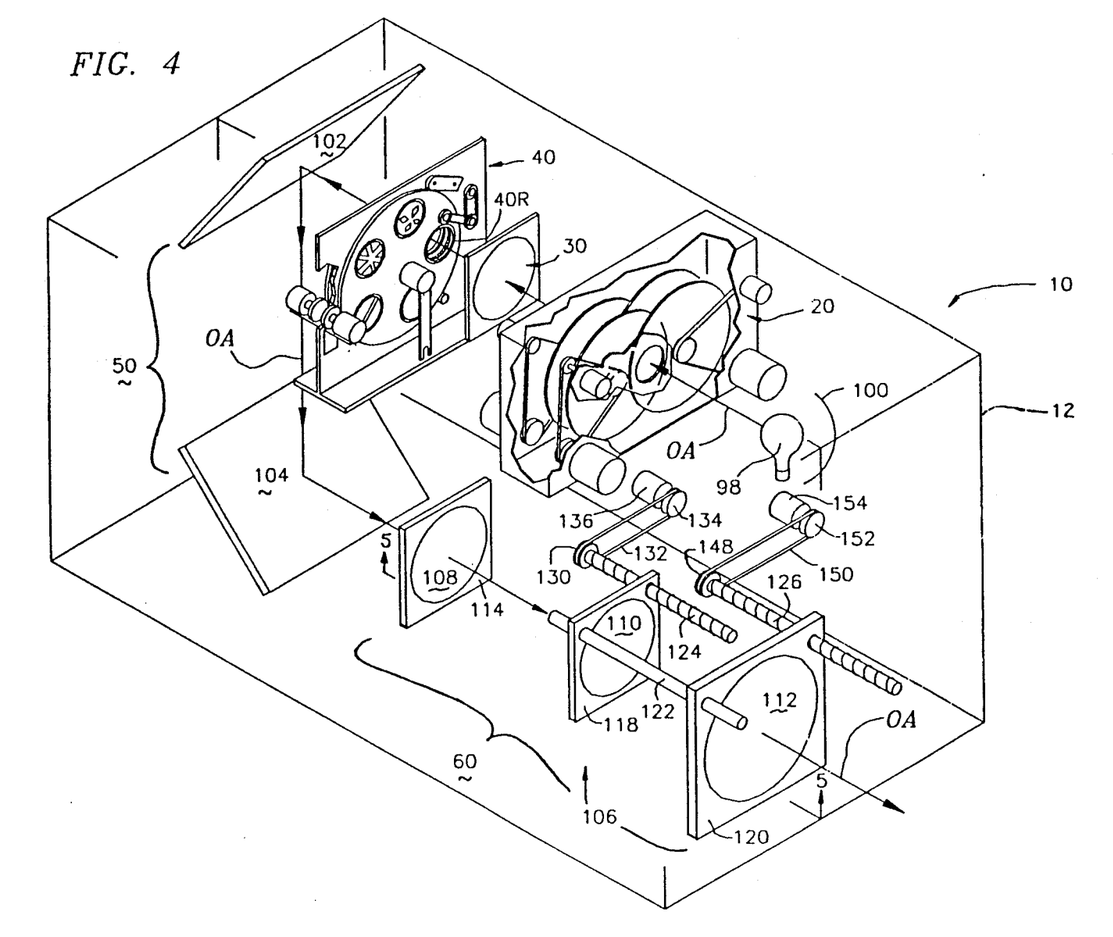
FIG. 4 is a partially broken away isometric view of the FIG. 1 light projector including a lens system according to the preferred embodiment of the invention.

In FIG. 4, housing 12 is omitted except in outline to reveal how projector 10 uses a light source in the form of a short arc lamp 98 with a reflector 100 which directs light leftward along optical axis OA. To vary its color and intensity, the light may be passed through a spectral filtering means 20 interposed in axis OA somewhere other than in a back-focal plane of lens system 60. The preferred spectral filtering means 20 is described in Applicant's co-pending application Ser. No. 224,436 filed Jul. 26, 1988, now U.S. Pat. No. 4,914,55. Besides or instead of filtering means 20 it is also possible to use a conventional scrolling film filter (not shown).

Downstream from filtering means 20, condenser lens 30 focuses the light towards a back-focal plane of lens system 60, where aperture means 40 defines the light into a beam along axis OA. The preferred aperture means 40 controllably positions a selected pattern aperture around axis OA as described in Applicant's co-pending application Ser. No. 224,438 filed Jul. 26, 1988, now U.S. Pat. No. 4,891,738.

Light projector 10 is preferably arranged compactly through the use of beam folding means 50, in which (as shown in FIG. 4) at least one mirror folds the optical axis OA. Mirrors 102 and 104 need not be adjacent but are preferably both located between condenser lens 30 and lens system 60.

Figure 5:
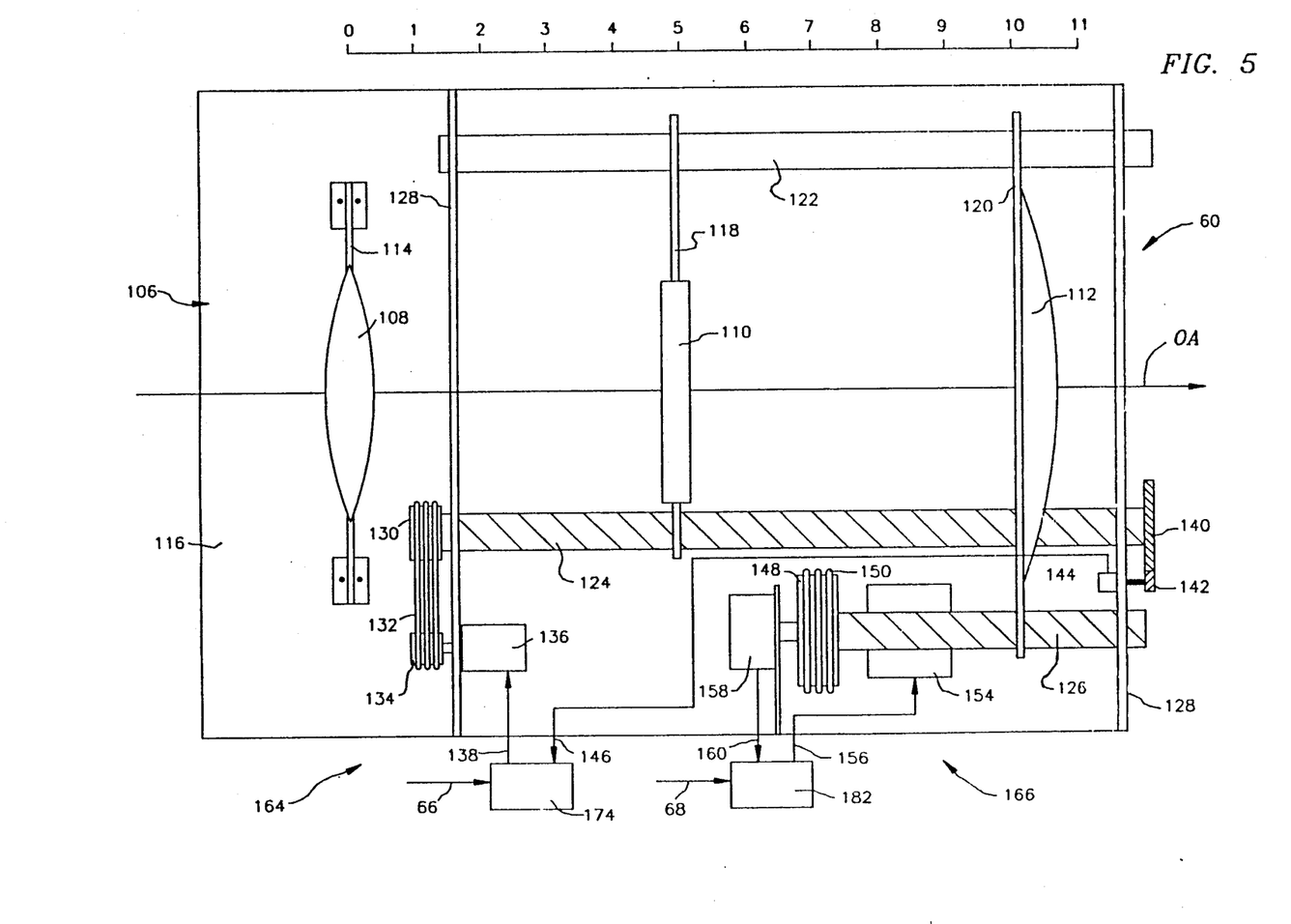
FIG. 5 is a bottom view taken along line 5—5 of the lens system of FIG. 4.

Referring also to FIG. 5, downstream from aperture means 40, the beam is focused through a lens system 60 using a triplet lens 106, which is a zoom lens such as a Cooke triplet, the optical principles of which are well known. Triplet lens 106 includes a convergent rear lens 108, a divergent middle lens 110, and a convergent front lens 112. Converging lens 108 is for example bi-convex with a diameter of four inches and a focal length of 6.2 inches. Diverging lens 110 is for example bi-concave with a diameter of three and one-quarter inches and a focal length of minus five and one-fifth inches. Converging lens 112 is for example plano-convex with a diameter of five and one-half inches and a focal length of 14.6 inches. Lens system 60 is adaptable as explained below to use different types of lenses as replacements for lenses 108, 110 and 112. Each of lenses 108, 110, and 112 may include a group of lens elements.

Lens 108 is held aligned on axis OA by frame 114, which is fixedly mounted on a base 116 (not shown in FIG. 4). Lenses 110 and 112 are held by movable frames 118 and 120, respectively. Frame 118 is supported slidably along smooth guide rod 122 and driven by threaded lead screw 124 parallel to axis OA. Frame 120 is slidably supported along guide rod 122 and driven by lead screw 126. The ends of guide rod 122 and of lead screws 124 and 126 are preferably supported on upright portions 128 of base 116.

To advance or retract middle lens 110, lead screw 124 is rotated by pulley 130, belt 132 and pulley 134 while motor 136 is driven by middle lens actuator drive signals received on line 138 as explained below. Lead screw 124 rotations are transferred through gears 140 and 142 and sensed by a potentiometer 144 to generate middle lens position feedback signals on line 146.

To move forward lens 112, lead screw 126 is rotated by pulley 148, belt 150 and pulley 152 (FIG. 4) while motor 154 is driven by front lens actuator drive signals received on line 156 as explained below. Lead screw 126 rotations are sensed by a potentiometer 158 which generates front lens position feedback signals on line 160.

Figure 6:
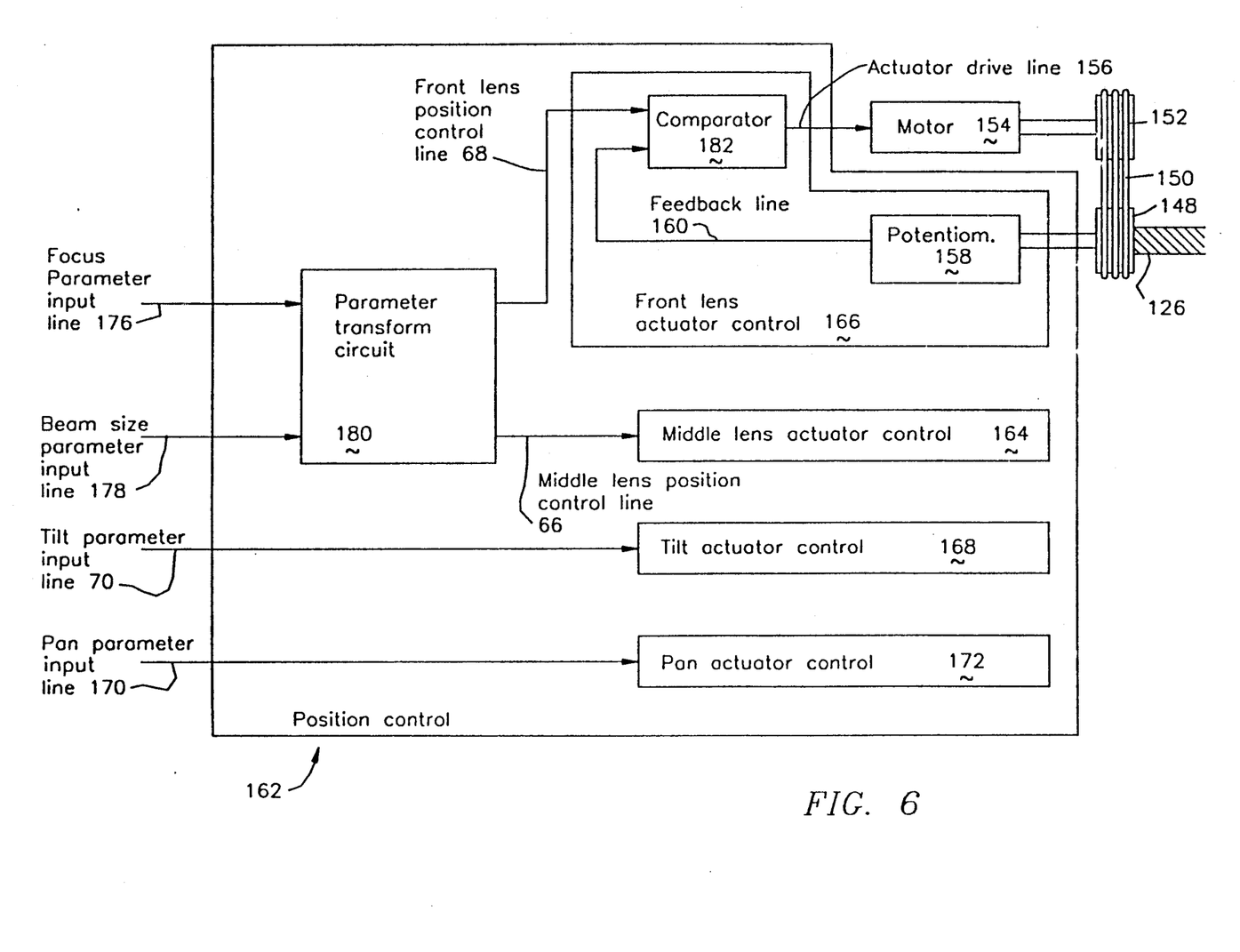
FIG. 6 is a schematic block diagram of example control circuits for the panning mechanism of FIG. 1, the tilting mechanism of FIGS. 2 and 3, and the lens actuator mechanisms of FIG. 5.

With reference to FIG. 6, position control circuit 162 provides position control signals on front lens position control line 68 to front lens actuator control means 166, on middle lens position control line 66 to middle lens actuator control means 164, on tilt position parameter input line 70 to tilt actuator control means 168, and on pan position parameter input line 170 to pan actuator control means 172.

In front lens actuator control means 166, for example, line 68 front lens (desired) position control signals are applied to a front lens position comparator circuit 182 and compared to the front lens (actual) position feedback signals received on line 160. Depending upon the comparison of the control signal to the feedback signal, comparator 182 applies to motor drive line 156 an actuator drive signal which is either negative to reverse motor 154 and thereby retract lens 112 or positive to advance motor 154 and thereby extend lens 112, until the line 160 feedback signal indicates that the lens' actual position equals its desired position. Comparators 182, 174, 88 and 59 may be analog or digital (difference) circuits according to the type of signalling used. Middle lens actuator control 164, tilt actuator control 168 and pan actuator control 172 are preferably similarly constructed. Lens actuator motors 136 and 154 may be either analog servo motors or digital stepper motors, according to the type of signalling used.

Beam focus and size parameters (selected from the focus and size axes of FIG. 7) are input to lines 176 and 178 and, through transform circuit 180, converted into front and middle lens position control signals on lines 68 and 66, respectively. Circuit 180 is preferably a look-up table such as a read only memory (ROM) programmed to transform input parameters on lines 176 and 178 into position control signals on lines 66 and 68 for specific lenses. The lens position control signals cause comparators 174 and 182 to produce actuator drive signals to cause motors 136 and 154 to position lenses 110 and 112.

The invention has the advantage that position control circuit 162 can be reconfigured simply by replacing ROM 180 with a substitute ROM programmed to convert focus and size input parameters into lens position control signals to enable lens actuator control means 166 and 164 to correctly position different types of front and middle lenses to focus and magnify a beam of light received from the rear lens.

In the operation of projector 10, a beam of light projected along axis OA can be aimed in a direction desired by a system controller, either a manually controlled digital rheostat, an "on-board" microprocessor such as an Intel (R) model 8088, or a remote computer such as a "PanCommand" console available from Morpheus Lights, Inc. of San Jose, Calif. (not shown). The system controller applies to line 170 input parameters for pan control signals which cause pan actuator control means 172 to activate motor 46 to advance and/or reverse until it has driven large gear 32 and rigidly connected bracket 16 (through a panning range of for example 360 degrees) to the desired angle around the axel 28 centerline panning axis.

Besides pan control signals, position control means 162 receives on line 70 input parameters for tilt control signals which cause tilt actuator control means 168 to activate motor 84 to advance and/or reverse until it has driven large gear 64 and bracket arm 14 (through a tilting range of for example 240 degrees) to the control signal-indicated angle around the axel 62 centerline tilting axis. Preferably, both panning and tilting are done at controllably variable speeds and have 250 steps of resolution per 180 degrees of function travel.

Figure 7:
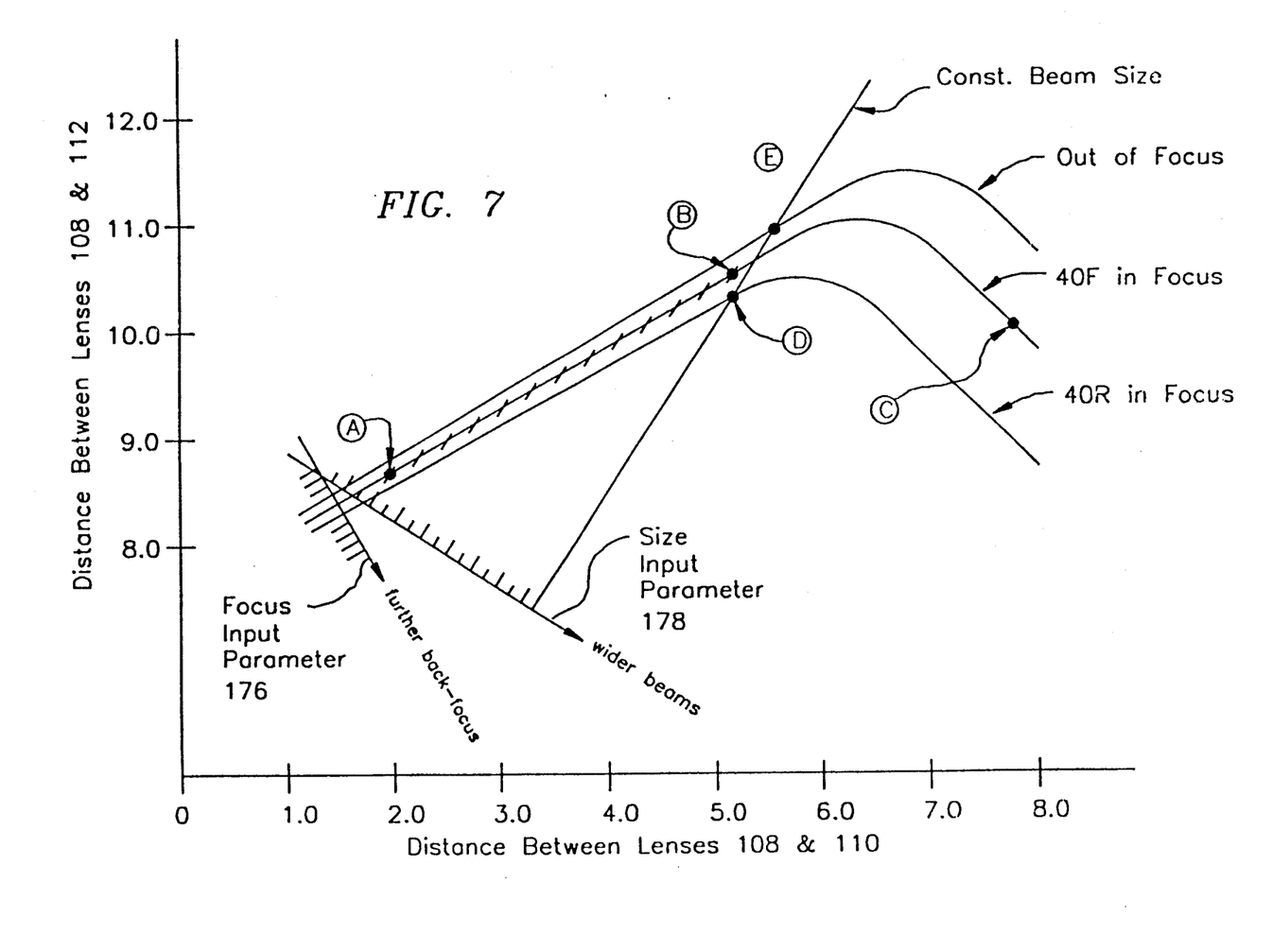
FIG. 7 is a graph showing how the beam focus and size are related to the positions of the lenses of FIG. 5.

Light from source 98 radiating along optical axis OA and emerging in a beam from aperture means 40 passes through triplet lens 106 to be focused and magnified in a range of between 2 degrees and 25 degrees, for example, depending upon the lens positions as illustrated in the FIG. 7 graph.

To focus the beam from a given back focal distance to project an image having a given size, a focus parameter is input on line 176 and a beam size parameter is input on line 178 for the coordinates of a point such as point A. The focus and size parameters on lines 176 and 178 are applied as addresses to ROM circuit 180 locations, converted into lens position control signals, and output on lines 66 and 68 to the respective actuator control circuits 164 and 166. In response, the actuator control circuits produce actuator drive signals on lines 138 and 156 which drive middle lens motor 136 and front lens motor 154 to turn lead screws 124 and 126 and shift lenses 110 and 112 respectively to positions as shown in FIG. 8A, where triplet lens 106 focuses from the front aperture 40F (not visible in FIG. 4) into a projected image with crisp edges.

Figures 8A, 8B:
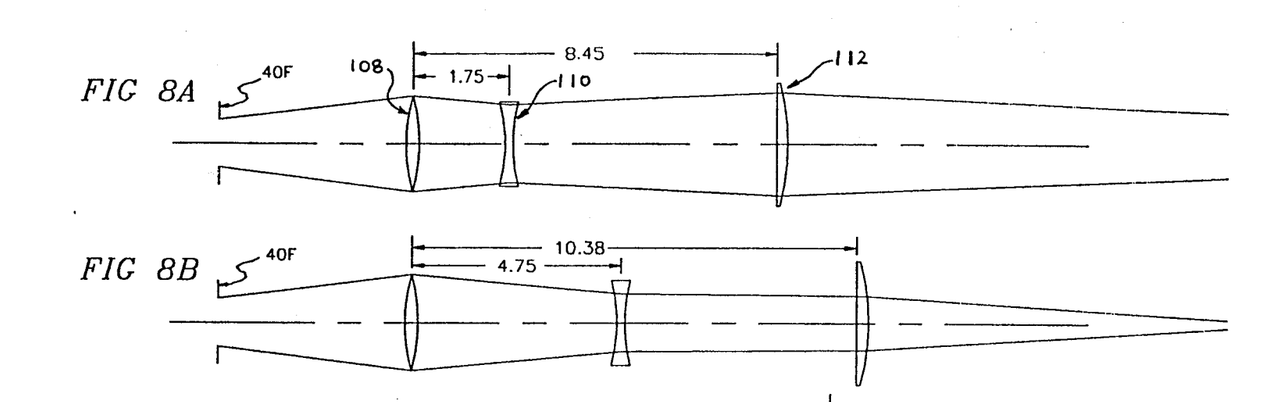
FIGS. 8A through 8E show the geometrical relationships of light beams to the triplet lenses when positioned at the coordinates of points A through E respectively in the graph of FIG. 7.

From point A, the beam size can be adjusted while maintaining the beam focus constant by applying input parameters to move the lenses to positions having the coordinates of other points along the front aperture constant-focus line, for example point B where the beam size is increased as shown in FIG. 8B. As the beam size increases, its intensity decreases.

Figures 8C, 8D:
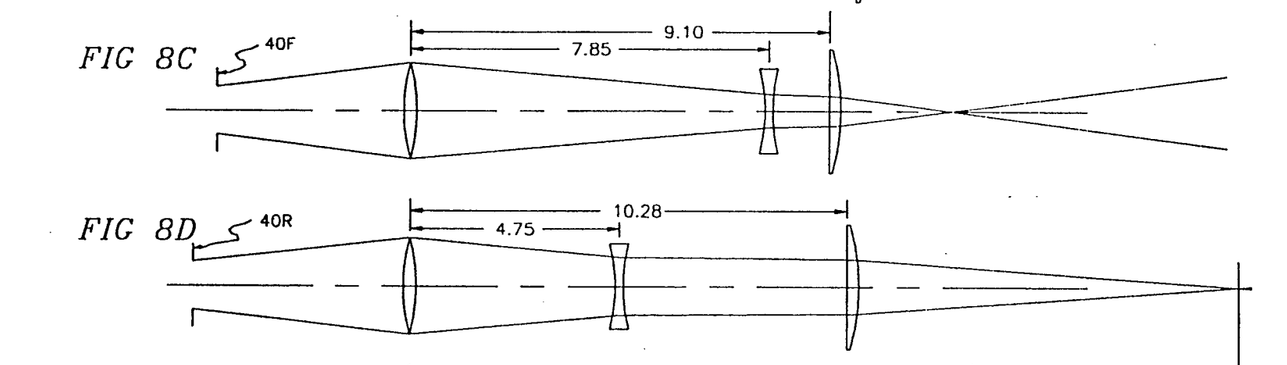

The beam size can be further increased while maintaining the focus constant by applying input parameters to move lenses 110 and 112 to a position having the coordinates of another point along the constant focus line, for example point C where the beam size is further increased as shown in FIG. 8C.

To switch the focus from the front aperture 40F to the rear aperture 40R, beam focus and size parameters for the coordinates of point D for example can be applied to input lines 176 and 178 to position the lenses as shown in FIG. 8D. This produces a beam slightly wider than that projected by the lenses in position B.

Figure 8E:
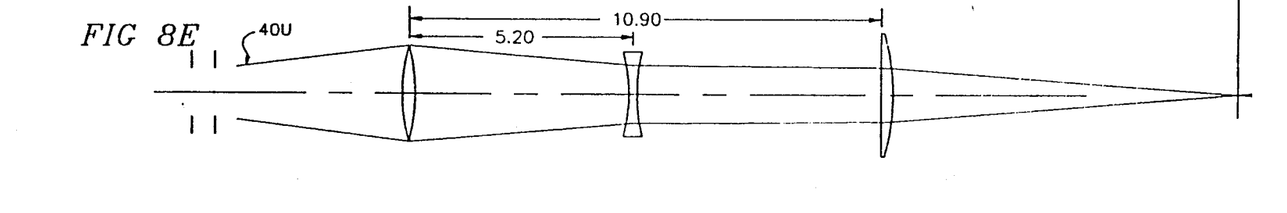

The beam size can be maintained constant while its focus is adjusted by applying input parameters to cause motors 136 and 154 to move lenses 110 and 112 through positions having the coordinates of other points along a constant beam size line. For example, from lens position D, a beam focused from rear aperture 40R can be maintained at the same size during refocusing in response to lens position control signals derived by ROM 180 from input parameters for the coordinates of point E. This shifts the back-focal plane forward to "focus" (i.e. defocus) a frosted edge beam from aperture-less focal plane 40U (not shown in FIG. 4). The lens actuators move the lenses to the position shown in FIG. 8E. In the FIG. 7 graph, constant beam size line D-E nearly parallels a constant lens separation line (not shown), so lenses 110 and 112 move only slightly closer together while their average (or mid-point) position moves substantially.

Although the present invention has been described in terms of a preferred embodiment, it will be appreciated by those skilled in the art that modifications thereof, and in particular substitution of different lens types, may be made without departing from the essence of the invention. It is therefore intended that the following claims be interpreted as covering any and all such modifications falling within the true spirit and scope of the invention.

What is claimed is:

1. Apparatus for controllably adjusting the size of a beam of light passing along an optical axis through said apparatus, comprising:
   optical triplet means including
      rear lens means having an axially fixed positive lens element, middle variator lens means having a movable negative lens element, and front compensator lens means having a movable positive lens element, aligned on said axis,
   said middle and front lens means having respective lens actuator means for receiving lens actuator drive signals and, mechanically independently of any other lens actuator means, responsively moving the associated lens element by corresponding distances along said axis; and
   position control means, including electronic circuits, for receiving beam size parameter inputs and responsively providing middle lens actuator drive signals for the middle lens actuator means to move said negative lens element along said axis appropriately to adjust the size of said beam and simultaneously providing correlated front lens actuator drive signals for the front lens actuator means to move said movable positive lens element appropriately in compensation to maintain the focus, through adjustment of the size, of the beam; and means for providing beam size parameter inputs to said position control means.

2. Apparatus as recited in claim 1 and further comprising:

optical axis-orienting means, including
tilt actuator means for receiving tilt actuator drive signals and responsively operative to rotate said triplet means around a substantial horizontal axis of tilting perpendicular to said optical axis, and
pan actuator means for receiving pan actuator drive signals and responsively operative to rotate said triplet means around a substantially vertical axis of panning;
wherein said position control means further comprises tilt actuator control means and pan actuator control means respectively for receiving tilting and panning control signals representing tilting and panning parameter inputs, and for responsively providing tilt actuator drive signals and pan actuator drive signals to respective actuator means to orient said optical axis; and further comprising
tilt parameter input means and pan parameter input means for providing tilting and panning control signals to said tilt actuator control means and said pan actuator control means, respectively.

3. Apparatus as in claim 2 wherein said position control means provides lens actuator drive signals having values with predetermined non-linear relationships to said beam size parameter inputs.

4. Apparatus as in claim 2 wherein said position control means comprises transform means including a replaceable logic circuit which is programmed, according to known characteristics of selected lens means, to transform said beam parameter inputs into lens element position control signals for use in providing said lens actuator drive signals.

5. Apparatus as in claim 4 wherein said position control means comprises:

middle and front lens actuator control means, each including respective
potentiometer means for sensing the optical axis position of the respective lens element and for responsively producing feedback signals indicating said positions; and
comparator means for sensing the signs of the differences between values of said lens element position control signals and of said feedback signals and for responsively producing actuator drive signals to energize the respective lens actuator means.

6. Apparatus as in claim 5 wherein each of said lens actuator means comprises an analog servo motor.

7. Apparatus as in claim 4 wherein each of said lens actuator means comprises a digital stepper motor.

8. Apparatus as in claim 7 wherein said position control means comprises, for each of said lens actuator means: lens actuator control means including electronic processor means for controlling the respective stepper motor.

9. Apparatus as in claim 2 wherein said optical-axis orienting means comprises:
a housing for supporting said optical triplet means;
a bracket with a horizontal bar connecting two substantially parallel vertical arms; and
base means;
wherein said tilt actuator means includes first gimbal joint means for supporting said housing rotatably around said axis of tilting between said arms; and
said pan actuator means includes second gimbal joint means for supporting said bracket bar rotatably around said axis of panning on said base means.

10. Apparatus as recited in claim 9 and further comprising a display light source disposed within said housing radiating light in a beam along said optical axis entering said first rear lens element, passing through said triplet means and exiting from said front lens element.

11. A lens system for adjusting the size of a beam of light passing along an optical axis through said system, comprising:

at least two lens means each including
a lens element movably aligned on said axis, and
a lens actuator means which is responsive, independently of any others of said lens actuator means, to respective lens actuator drive signals to move said lens element a predetermined distance along said axis;
position control means, including electronic circuit means, for receiving a beam size input parameter and responsive thereto to provide respective lens actuator drive signals for each said lens actuator means to move the respective lens element to maintain the focus while adjusting the size of the beam, and for receiving beam tilt and pan parameter inputs and providing in response thereto tilt drive signals and pan drive signals, respectively;
optical axis tilting means responsive to said tilt drive signals to tilt said optical axis around a horizontal axis of tilting;
optical axis panning means responsive to said pan drive signals to pan said optical axis around a vertical axis of panning to thereby control the direction of light projected along said optical axis;
means for providing beam tilt and pan parameter inputs to said position control means; and
means for providing beam size parameter inputs to said position control means.

12. A lens system as in claim 11 further comprising a light projector including:
a housing for supporting said lens system;
a bracket with two substantially parallel arms connected by a horizontal bar;
first gimbal joint means for rotatably supporting said housing around a horizontal axis of tilting between said arms;
base means; and
second gimbal joint means for rotatably supporting said bar around a vertical axis of panning.

* * * * *

UNITED STATES PATENT AND TRADEMARK OFFICE
CERTIFICATE OF CORRECTION

PATENT NO. : 5,029,992

DATED : Jul. 9, 1991

INVENTOR(S) : Brian E. Richardson

It is certified that error appears in the above-identified patent and that said Letters Patent is hereby corrected as shown below:

On the title page, in item [75], "John R. Richardson" should be

--Brian E. Richardson--.

Signed and Sealed this

Sixteenth Day of June, 1992

Attest:

DOUGLAS B. COMER

Attesting Officer

Acting Commissioner of Patents and Trademarks